(12) United States Patent
Zhang et al.

(10) Patent No.: US 12,375,569 B2
(45) Date of Patent: Jul. 29, 2025

(54) INTERNET OF THINGS TABLET DEVICE REGISTRATION METHOD AND SYSTEM BASED ON REGISTRATION TEMPLATE

(71) Applicant: Chengdu Vantron Technology Co., Ltd., Chengdu (CN)

(72) Inventors: Landong Zhang, Chengdu (CN); Bo Wei, Chengdu (CN)

(73) Assignee: Chengdu Vantron Technology Co., Ltd., Sichuan (CN)

( * ) Notice: Subject to any disclaimer, the term of this patent is extended or adjusted under 35 U.S.C. 154(b) by 20 days.

(21) Appl. No.: 18/430,734

(22) Filed: Feb. 2, 2024

(65) Prior Publication Data
US 2024/0267431 A1 Aug. 8, 2024

(30) Foreign Application Priority Data
Feb. 3, 2023 (CN) .......................... 202310052807.9

(51) Int. Cl.
| | |
|---|---|
| *H04L 67/141* | (2022.01) |
| *G06K 19/06* | (2006.01) |
| *H04L 9/32* | (2006.01) |
| *H04L 41/0806* | (2022.01) |

(52) U.S. Cl.
CPC ...... *H04L 67/141* (2013.01); *G06K 19/06037* (2013.01); *H04L 9/3213* (2013.01); *H04L 41/0806* (2013.01)

(58) Field of Classification Search
CPC . H04L 67/141; H04L 41/0806; H04L 9/3213; G06K 19/06037

USPC .......................................................... 709/228
See application file for complete search history.

(56) References Cited

U.S. PATENT DOCUMENTS

| | | | | |
|---|---|---|---|---|
| 10,778,460 | B1 * | 9/2020 | Khan ...................... | H04L 67/34 |
| 10,877,820 | B1 * | 12/2020 | Jaakola ................... | G06F 9/544 |
| 2005/0240437 | A1 * | 10/2005 | Cunningham ......... | G06Q 10/10 |
| | | | | 705/2 |
| 2014/0025742 | A1 * | 1/2014 | Ukkola ................. | H04W 60/04 |
| | | | | 709/204 |

(Continued)

FOREIGN PATENT DOCUMENTS

| | | |
|---|---|---|
| CN | 104065167 A | 9/2014 |
| CN | 104601445 A | 5/2015 |

(Continued)

*Primary Examiner* — Ruolei Zong
(74) *Attorney, Agent, or Firm* — SALIWANCHIK, LLOYD & EISENSCHENK

(57) ABSTRACT

The present invention relates to the field of Internet of Things communication technologies, and in particular, to an Internet of Things tablet device registration method and system based on a registration template. The method includes the following steps: A terminal device sends a zero-contact registration request to a cloud server; the cloud server retrieves a corresponding registration template based on a product serial number in the zero-contact registration request, binds the retrieved registration template to the terminal device, and generates a communication token corresponding to the terminal device; and based on the communication token, the terminal device establishes a communication connection to the cloud server, downloads an initialization configuration task from the cloud server, and completes initialization setting based on the initialization configuration task.

11 Claims, 5 Drawing Sheets

(56) References Cited

U.S. PATENT DOCUMENTS

| | | | | |
|---|---|---|---|---|
| 2015/0149315 A1* | 5/2015 | Tischer | ................ | G06Q 50/01 |
| | | | | 705/26.1 |
| 2019/0057161 A1* | 2/2019 | Ackerman | .............. | G06F 16/29 |
| 2022/0131848 A1* | 4/2022 | Shiner | ................... | H04W 12/48 |

FOREIGN PATENT DOCUMENTS

| | | | | | |
|---|---|---|---|---|---|
| CN | 106846621 | A | * | 6/2017 | |
| CN | 114389833 | A | * | 4/2022 | ............... G06F 7/58 |

* cited by examiner

INTERNET OF THINGS TABLET DEVICE REGISTRATION METHOD AND SYSTEM BASED ON REGISTRATION TEMPLATE

CROSS-REFERENCE TO RELATED APPLICATION

This application claims the benefit of Chinese Patent Application No. 202310052807.9, filed Feb. 3, 2023, which is hereby incorporated by reference in its entirety including any tables, figures, or drawings.

TECHNICAL FIELD

The present disclosure relates to the field of Internet of Things communication technologies, and in particular, to an Internet of Things tablet device registration method and system based on a registration template.

BACKGROUND

Based on rapid expansion of the concept of the Internet of Things, Internet of Things tablet devices are widely used in various fields, such as an industrial tablet used to control a machine tool in a factory, and an exhibition tablet used to play advertisements in elevators. Internet of Things devices bring their own functional values to users, but also incur operation and maintenance costs for operating and configuring the devices. Therefore, it is increasingly urgent to optimize a man-machine interaction solution, simplify a process of registering a device with a cloud, reduce a manual operation burden on a user as much as possible, and take advantage of cloud coordination to manage devices.

An existing interaction method between an Internet of Things cloud and a tablet device requires a user to manually enter an account password to register the device with the cloud. After the registration ends, the user still needs to manually control the device to complete a subsequent configuration work. For an administrator who controls a large quantity of devices in the industrial field, having to repeatedly and manually participate in a process of registering each device with the cloud undoubtedly adds a great deal of operation and maintenance workload.

SUMMARY

For a defect that a tablet device needs to be manually registered and configured for networking in the conventional technology, the present disclosure provides an Internet of Things tablet device registration method and system based on a registration template. After a tablet device is connected to a network, the tablet device may be connected to a cloud through the network to automatically complete registration and subsequent initialization configuration under the condition that a device administrator does not intervene in the whole process.

To achieve the foregoing objective of the present invention, the present disclosure provides the following technical solutions:

An Internet of Things tablet device registration method based on a registration template includes the following steps:
a terminal device automatically invokes an open registration interface of a cloud server, and sends a zero-contact registration request to the cloud server;
the cloud server retrieves a corresponding registration template based on a product serial number in the zero-contact registration request, binds the retrieved registration template to the terminal device, and generates a communication token corresponding to the terminal device; and
the terminal device establishes a communication connection to the cloud server based on the communication token, downloads an initialization configuration task from the cloud server, and completes initialization setting based on the initialization configuration task, where the initialization configuration task is generated by the cloud server based on configuration content of the retrieved registration template.

In a preferred solution of the present disclosure, the method further includes the following step: Before registration of the terminal device, the cloud server generates the registration template, and imports a product serial number of the to-be-connected terminal device into the registration template.

In a preferred solution of the present disclosure, the method further includes the following step: The cloud server groups the terminal device based on a link grouping configuration of the registration template.

In a preferred solution of the present disclosure, the method further includes the following step: If no communication token is obtained by using the zero-contact registration request, a registration template identifier is obtained by scanning a QR code, and a registration request is initiated to the cloud server by using the registration template identifier; or a registration template identifier is directly input, and the registration template identifier is used as a request parameter to initiate a registration request to the cloud server.

In a preferred solution of the present disclosure, that the terminal device establishes a communication connection to the cloud server based on the communication token includes the following steps:
the cloud server places the communication token in a response packet of the registration request as a response parameter, and returns the response packet to the terminal device; and
after receiving the response packet indicating successful registration, the terminal device obtains the communication token in the response packet, and establishes a communication connection to the cloud server by using the communication token and an MQTT protocol.

In a preferred solution of the present disclosure, content of the initialization setting includes initial volume and brightness, function permissions, application locking, and initial application of the terminal device.

Based on a same concept, an Internet of Things tablet device registration system based on a registration template is further proposed, including a terminal device, a device registration module, and a remote instruction module, where
the device registration module and the remote instruction module are in a cloud server;
the terminal device automatically invokes an open registration interface of the cloud server and sends a zero-contact registration request to the cloud server; the terminal device is further configured to download an initialization configuration task from the cloud server, and completes initialization setting based on the initialization configuration task, where the initialization configuration task is generated by the cloud server based on configuration content of a retrieved registration template;
the device registration module retrieves a corresponding registration template based on a product serial number in the zero-contact registration request, binds the retrieved registration template to the terminal device, and generates a communication token corresponding to the terminal device; and the remote instruction module is configured to establish a communication connection between the terminal device and the cloud server based on the communication token.

In a preferred solution of the present disclosure, the cloud server further includes a registration template module; and the registration template module is configured to generate a registration template, and the registration template has a corresponding identification code.

Based on a same concept, an Internet of Things tablet device registration device based on a registration template is further proposed, including at least one processor, and a memory that is communicatively connected to the at least one processor. The memory stores instructions executed by the at least one processor, and the instructions are executed by the at least one processor, so that the at least one processor can execute the Internet of Things tablet device registration method based on a registration template in any one of the foregoing descriptions.

Based on a same concept, a computer-readable storage medium is further proposed. The computer-readable storage medium stores a computer program. When the computer program is executed by a processor, the Internet of Things tablet device registration method based on a registration template in any one of the foregoing descriptions is implemented.

Compared with the conventional technology, the present disclosure has the following beneficial effects:

According to the method and device in the present disclosure, the terminal device, after being connected to a network, may be connected to a cloud through the network to automatically complete registration and subsequent initialization configuration under the condition that a device administrator does not intervene in the whole process.

DESCRIPTION OF EMBODIMENTS

Figure 1:
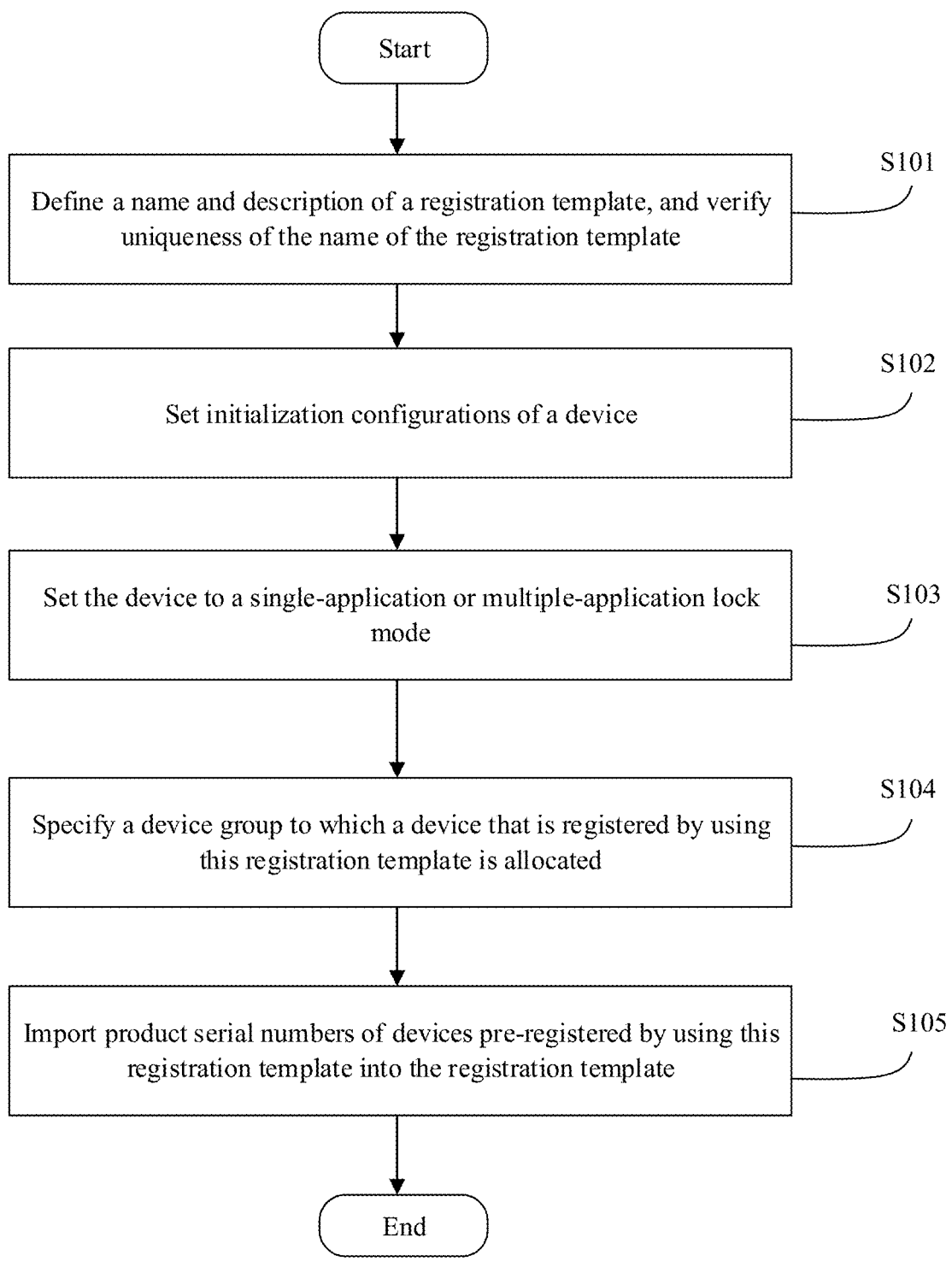
FIG. 1 is a flowchart of an Internet of Things tablet device registration method based on a registration template in some embodiment.

The following further describes the present invention in detail with reference to test cases and specific implementations. However, it should not be understood that the scope of the above-mentioned subject matter of the present invention is limited to the following embodiments, and all technologies implemented based on the contents of the present invention belong to the scope of the present invention.

Embodiment 1

This embodiment provides an Internet of Things tablet device registration system based on a registration template. The system includes:

a terminal device, and a cloud server, where a toolkit for connecting to the cloud server is loaded on the terminal device.

The cloud server is configured to manage and control the terminal device registered with the server.

The cloud server further includes:

a device registration module, and a remote instruction module, where the device registration module receives a registration request of the terminal device, retrieves a pre-bound target registration template based on a packet on the registration request, binds the registration template to the terminal device that initiates the registration request, and sends content of the registration template to the terminal device after successful registration.

The remote instruction module is used by the cloud server to deliver an operation instruction to the terminal device that is successfully registered with and connected to the cloud server, so that the cloud server can remotely control the terminal device.

The cloud server further includes:

a registration template module, where a registration template is a copy of initialization configuration content customized for terminal devices in batches. During registration of a device, the cloud server binds a unique registration template to the device. After the registration template is generated, product serial numbers of the terminal devices in batches may be imported into the registration template module and are associated with the registration template, and one product serial number can be associated with only one registration template.

The registration template further includes:

a unique identification code: the cloud server locks a unique registration template by using the unique identification code;

an identity QR code: the cloud server generates a dynamic identity QR code for the registration template, so that the terminal device scans the QR code to extract content of the registration template;

a device configuration item: the device configuration item may be used to set configuration content such as initial volume and brightness, function permissions, application locking, and initial application of the terminal device;

link groups: after being registered with a platform, the terminal device is automatically mounted to a specified device group; and a device pool: the device pool is used to batch import product serial numbers of terminal devices to be bound to this registration template; and during registration of a device corresponding to a product serial number, the cloud server binds this registration template to the device.

An Internet of Things tablet device registration method based on a registration template specific includes the following content:

Before registration of a terminal device, a registration template customized for a service is generated in advance by using a registration template module of a cloud server.

A product serial number of the terminal device is imported into the registration template.

The terminal device is powered on, and after the terminal device is powered on for the first time after leaving the factory, the terminal device guides a user to configure an available Wi-Fi for the terminal device.

After being connected to the Wi-Fi, the terminal device first determines whether the terminal device has a communication token issued by the cloud server for each successfully registered device.

If the terminal device does not have a communication token issued by the cloud server, the terminal device automatically invokes an open registration interface of the cloud server, requests to set a registration manner to zero-contact registration, and sends a zero-contact registration request to the cloud server.

The zero-contact registration means that in an entire registration process of the terminal device, the user has no intervention and no perception and does not need to perform any operation, but the terminal device automatically initiates and completes registration and subsequent initialization configuration.

The cloud server retrieves, based a product serial number in the zero-contact registration request, a registration template associated with the product serial number, and binds the retrieved registration template to the device.

Further, the cloud server configures the successfully registered terminal device based on link groups in the registration template, and mounts the terminal device to a corresponding device group.

Further, the cloud server generates an initialization configuration task for the terminal device based on configuration content of the retrieved registration template. This configuration task is delivered when the terminal device establishes a communication link with the cloud server for the first time.

Further, the cloud server generates a unique communication token for the successfully registered terminal device, places the communication token in a response packet of the registration request as a response parameter, and returns the response packet to the terminal device.

After receiving a registration success response, the terminal device stores the communication token in the response in a secure memory area in which data is permanently stored.

The terminal device establishes a secure communication link for direct connection with the cloud server by using the obtained communication token and an MQTT protocol.

Preferably, the cloud server sets a status of the terminal device that establishes a connection to online.

Further, the cloud server retrieves the initialization configuration task of the terminal device, packages the initialization configuration task into a remote operation instruction, delivers the remote operation instruction to the terminal device, and sets a status of the remote operation instruction to "sent" after the remote operation instruction is delivered.

The remote operation instruction set to the sent state automatically monitors an instruction receipt notification sent by the terminal device. If the instruction receipt notification sent by the terminal device is not detected in a next period of time, the remote operation instruction is marked as "sending timeout".

Preferably, after receiving an initialization configuration instruction, the terminal device sends an instruction receipt notification to the cloud server, to notify the cloud server that the terminal device has handled the instruction.

The terminal device performs initialization configuration provided by the registration template of the cloud server.

After completing the initialization configuration, the terminal device sends an instruction execution result notification to the cloud server.

After receiving the instruction execution result notification, the cloud server updates an execution result of the remote operation instruction, to complete the device registration procedure.

Predictably, if a network connection exception occurs, an MQTT link between the cloud server and the device may be disconnected. After this scenario is triggered, the cloud server sets a status of the device to offline. In this case, if a remote operation is performed on the device, an instruction may not be normally delivered because the device is offline. However, when the device is connected again, the cloud server retrieves, based on an SN number of the connected device, all undelivered remote instructions within a period of time during which the device is disconnected, and delivers the remote instructions again.

If the zero-contact registration automatically triggered by the terminal device fails, the terminal device jumps to a manual registration interface.

The manual registration interface supports scanning a QR code for registration and manually inputting a registration template identifier for registration.

If the terminal device performs registration by using a QR code mode, the terminal device needs to scan a registration template QR code generated by the cloud server, to obtain the registration template identifier in the QR code.

Further, the terminal device invokes the open registration interface of the cloud server, requests to set a registration manner to QR code registration, and writes the registration template identifier into the message of the registration request.

Further, the cloud server handles the registration request of the terminal device, retrieves a target registration template based on the registration template identifier, and completes a registration procedure that has same subsequent steps as the foregoing zero-contact registration.

In addition, if the terminal device performs registration by using a template identifier registration mode, the registration template identifier needs to be manually input on a device registration interface, and is used as a request parameter to initiate a registration request to the cloud server.

The cloud server handles the registration request of terminal device, retrieves the target registration template based on the manually input registration template identifier of the terminal device, and completes the registration procedure that has the same subsequent steps as the foregoing zero-contact registration.

After registering successfully and completing the initialization configuration, the terminal device synchronizes its attribute status to the cloud at regular intervals by using a communication connection established with the cloud server.

Subsequently, the cloud server delivers a remote instruction to a registered device in real time by using the remote instruction module to remotely control the device.

Preferably, the terminal device may be a mobile communication terminal such as a tablet device, a notebook computer, or a mobile phone.

Embodiment 2

Figure 2:
FIG. 2 is an identification code and an identity QR code that can be scanned by a device in some embodiment.

FIG. 1 is a flowchart of an Internet of Things tablet device registration method based on a registration template according to an embodiment of the present invention. Specific steps are as follows:

S101: Define a name and description of a registration template, and verify uniqueness of the name of the registration template. After the name is set and uniqueness verification is passed, a cloud server automatically generates a unique 9-bit identification code and an identity QR code that can be scanned by a device for this registration template, where the identification code and the identity QR code that can be scanned by the device are shown in FIG. 2.

S102: Set initialization configurations of the device, initialize a screen lock password, a default application permission, and a system upgrade policy of the device, allocate originally carried application software to the device, and allocate function permissions such as screen locking, application installation and uninstallation, Bluetooth, camera, microphone, ADB, NFC, and USB to the device.

S103: Set the device to a single-application or multiple-application lock mode. If the application lock mode is enabled, the device runs to enter an application and cannot exit the application, limiting a user to use the device in a separate application.

S104: Specify a device group to which a device that is registered by using this registration template is allocated. The device group can facilitate the user to manage devices in a same group without distinction by using a group setting policy or initiating a remote instruction.

S105: Import product serial numbers of devices pre-registered by using this registration template into the registration template. When initiating zero-contact registration, these devices are bound to this template and complete subsequent initialization by using template configurations of this template.

After the registration template is successfully created, a tablet device on which a cloud connecting toolkit is loaded in a system application is selected to perform a subsequent registration operation.

In this embodiment, loading the cloud connecting toolkit is a condition required for the tablet device to access a cloud to implement registration. The toolkit is directly used in the system application of the tablet device before the tablet device leaves the factory.

Figure 3:
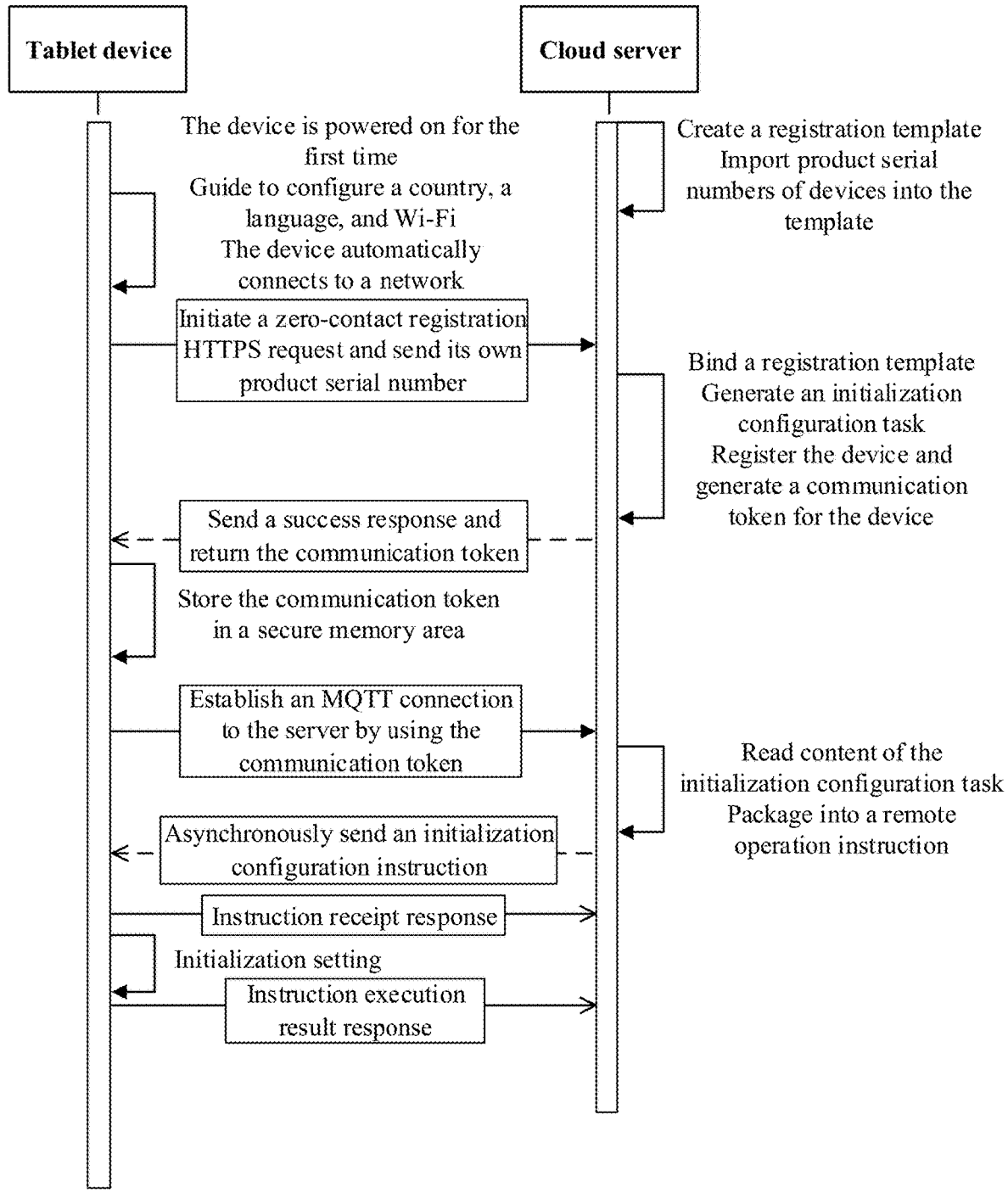
FIG. 3 is a flowchart of automatically initiating zero-contact registration to a cloud by a tablet device after boot setting is completed after initial power-on in some embodiment.

The selected tablet device automatically initiates zero-contact registration to the cloud after boot setting is completed after initial power-on. A process of initiating the zero-contact registration is shown in FIG. 3, and specific steps are as follows:

Step 1: When the tablet device is powered on for the first time, the system application of the tablet device guides the user to select a country and set a language and Wi-Fi.

Step 2: After the tablet device is connected to a network, the system application automatically invokes a registration interface in the cloud connecting toolkit, initiates a registration request based on the HTTPS protocol to the cloud server, and places the product serial number of the tablet device as a request parameter in a packet.

Step 3: After receiving the registration request initiated by the tablet device, the cloud server retrieves, by using the sent product serial number, a registration template into which the product serial number is imported, and binds the device to the registration template.

Step 4: Further, configuration content of the registration template is read, where all applications and files required when the device is initialized may be defined in the registration template, to define function permissions and an initial attribute of the device. The cloud server edits the read configurations into task parameters, and creates an initialization configuration task associated with the registered device, where when the tablet device is connected to the cloud server for the first time, the task is packaged into a remote instruction for delivery.

Step 5: The cloud server allocates the tablet device to a corresponding device group based on a link group configuration of the registration template, generates a unique communication token for the tablet device, and responds to the tablet device with the unique communication token. When the tablet device subsequently creates an MQTT connection to the cloud, the tablet device sends the communication token as an identity of the tablet device to the cloud server, and the cloud server identifies, by using the communication token sent by the tablet device, the connected target device in many registered devices.

Step 6: After receiving the communication token in a cloud response packet, the tablet device first stores the communication token in a secure memory area, and then uses the communication token as the identity of the tablet device to establish a communication connection to the cloud server based on an MQTT protocol.

Step 7: After establishing the MQTT connection to the device, the cloud server packages the pre-generated initialization configuration task into a remote operation instruction for delivery. After the instruction is delivered, a status of the instruction in a remote instruction record table is set to "sent".

Step 8: The tablet device needs to promptly send an instruction receipt notification upon receiving the remote instruction. The cloud server updates the status of the instruction to "received" in time based on the notification sent by the device.

Step 9: The device performs initialization setting, and sends an execution result notification after the initialization setting ends. The cloud server completes final status update of the instruction based on an execution result in the notification, and ends the initialization configuration task.

In another embodiment, the cloud server does not find a corresponding registration template based on the product serial number sent by the device, responds to the device with a zero-contact registration failure, and returns a failure description.

Embodiment 3

After receiving a failure response of zero-contact registration, a tablet device jumps to a manual registration page. The manual registration page supports scanning a QR code for registration and inputting a unique registration template identifier for registration.

Figure 4:
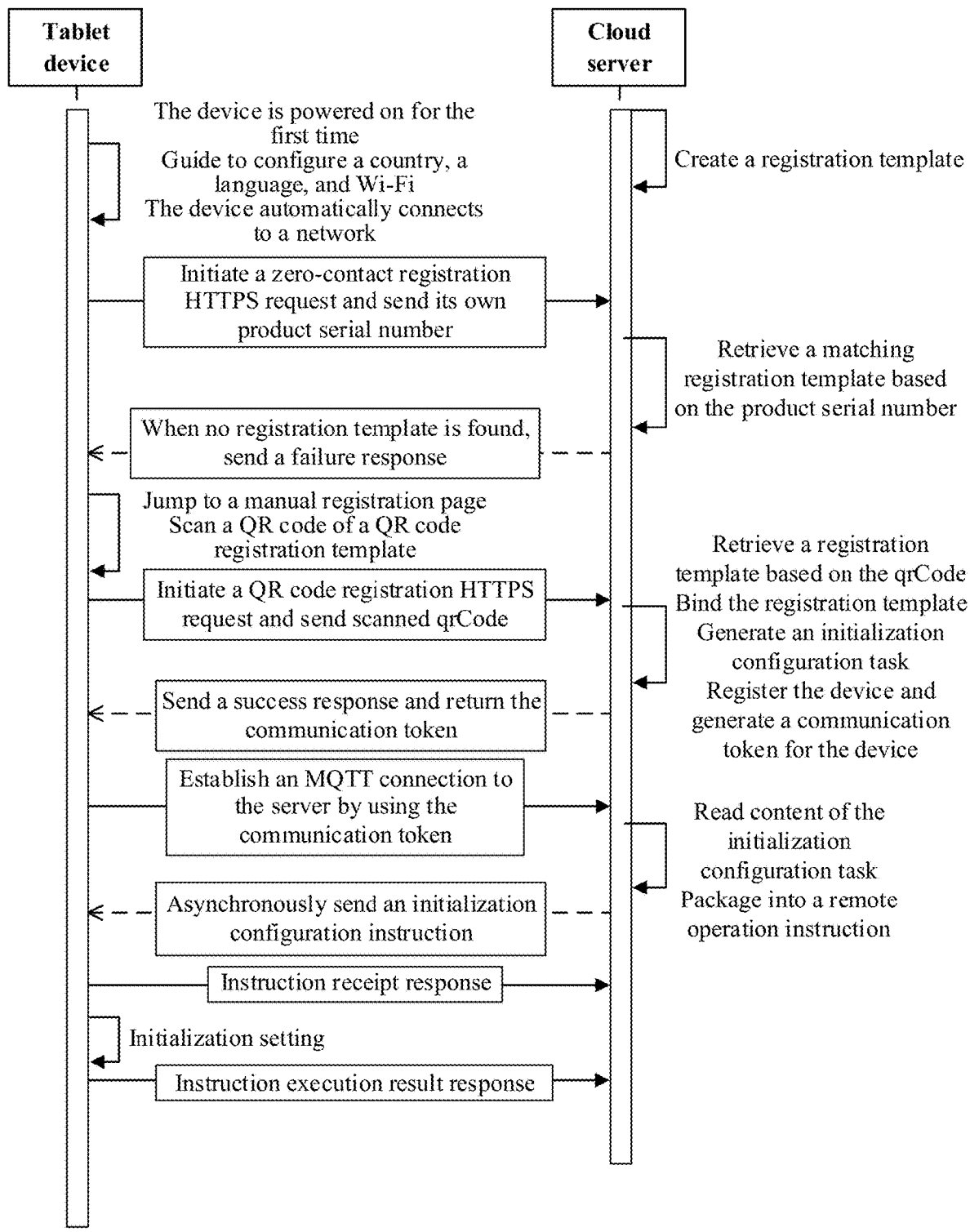
FIG. 4 is a flowchart of initiating registration to a cloud by a tablet device by scanning a QR code in some embodiment.

In this embodiment, registration is performed by scanning a QR code. Refer to FIG. 4. Specific steps are as follows:

Step 1: A cloud server retrieves, based on a product serial number sent by a tablet device, whether there is a registration template into which the product serial number is imported.

Step 2: When no matching registration template is found, generate a registration failure packet and respond to the tablet device with the registration failure packet.

Step 3: After receiving the registration failure response, the tablet device jumps to a manual registration page to scan a QR code mode page.

Step 4: A user taps a button for scanning a QR code to scan the identity QR code of the registration template shown in FIG. 2, and the tablet device parses and extracts a qrCode field in the QR code.

Step 5: Next, tap a registration button on the manual registration page to package the scanned qrCode into a request packet, and initiate an HTTPS protocol-based registration request to the cloud server.

Step 6: After receiving the registration request, the cloud server reads the qrCode sent by the tablet device, finds a corresponding registration template identity QR code based on the qrCode, and further finds a registration template corresponding to an identity of the registration template, to complete a subsequent registration procedure that is the same as the foregoing zero-contact registration.

Figure 5:
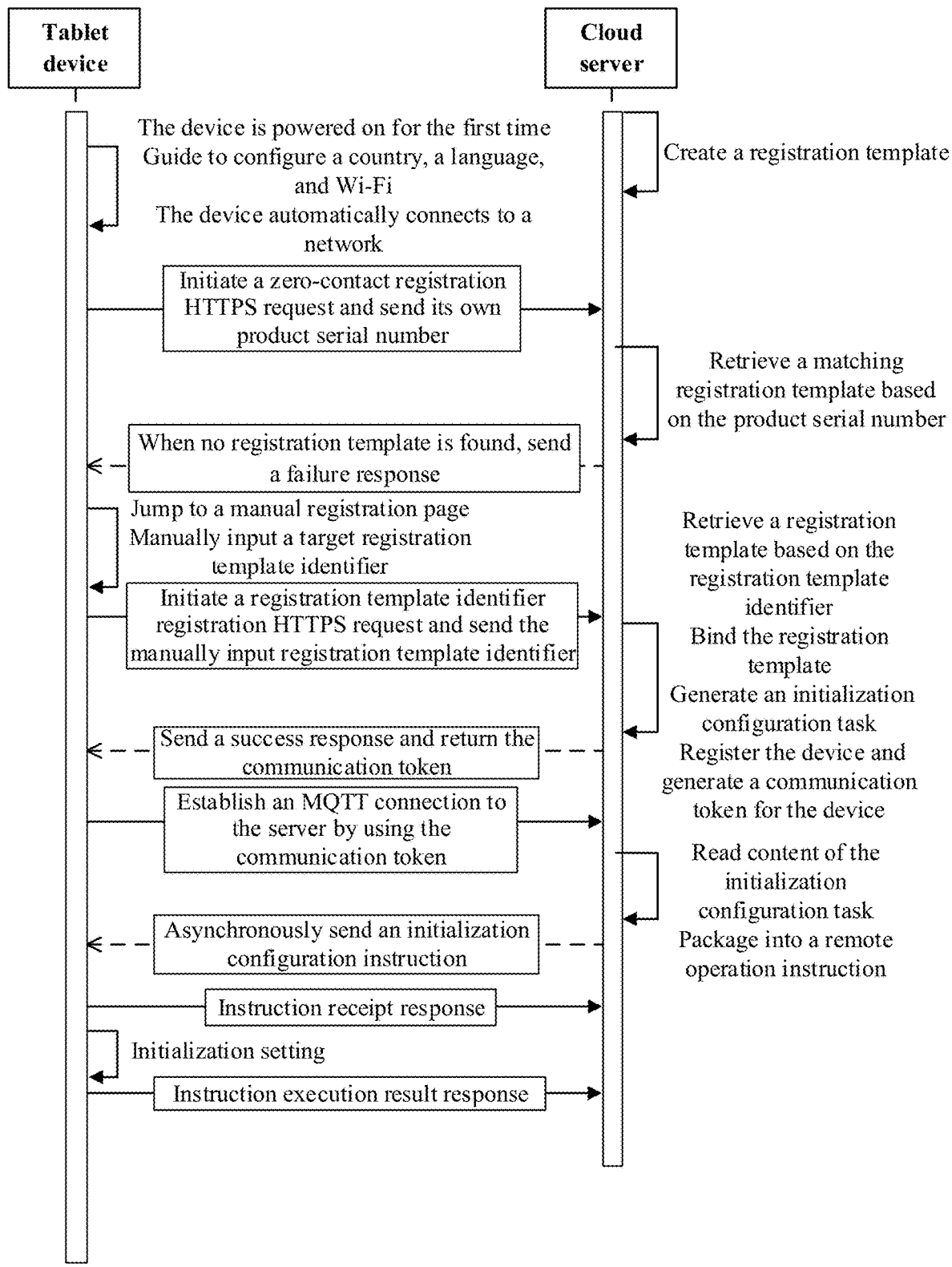
FIG. 5 is a flowchart of initiating registration to the cloud by the tablet device by manually inputting an identification code of a target registration template in some embodiment.

In addition, in the event of a zero-contact registration failure, considering registration requirements of some tablet devices that do not have cameras or capabilities to scan QR codes, an additional embodiment corresponding to the requirements is used for description. For a flowchart of initiating registration to a cloud by the tablet device by manually inputting an identification code of a target registration template, refer to FIG. 5, and specific steps are as follows:

Step 1: After the tablet device receives a cloud failure response and jumps to the manual registration page, manually input the identification code of the target registration template.

Step 2: Tap the registration button to package the manually input identification code of the registration template into a registration request packet, and initiate an HTTPS protocol-based registration request to the cloud server.

Step 3: After receiving the registration request, the cloud server reads the identification code of the registration template in the request packet, where the identification code is a unique identity of the registration template, and the server may retrieve, based on the identification code, a registration template corresponding to the identification code, to complete a subsequent registration procedure that is the same as the foregoing zero-contact registration.

Finally, it should be noted that the embodiments described in detail are merely better practices of the present invention, and should not be construed as limiting the scope of the present invention. Equivalent replacements of the technical solutions described in the foregoing embodiments do not depart essences of the corresponding technical solutions from the scopes of the technical solutions of the embodiments of the present invention, and all such replacements should fall within the scopes of the claims and the specification of the present invention.

What is claimed is:

1. An Internet of Things tablet device registration method based on a registration template, wherein the method comprises the following steps:
   automatically invoking, by a terminal device, an open registration interface of a cloud server, and sending a zero-contact registration request to the cloud server;
   retrieving, by the cloud server, a corresponding registration template based on a product serial number in the zero-contact registration request, binding the retrieved registration template to the terminal device, and generating a communication token corresponding to the terminal device; and
   establishing, by the terminal device, a communication connection to the cloud server based on the communication token, downloading an initialization configuration task from the cloud server, and completing initialization setting based on the initialization configuration task, wherein the initialization configuration task is generated by the cloud server based on configuration content of the retrieved registration template; and
   the method further comprises the following step: if no communication token is obtained by using the zero-contact registration request, scanning a QR code to obtain a registration template identifier, and initiating a registration request to the cloud server by using the registration template identifier; or directly inputting a registration template identifier, and using the registration template identifier as a request parameter to initiate a registration request to the cloud server.

2. The Internet of Things tablet device registration method based on a registration template according to claim 1, wherein the method further comprises the following step: before registration of the terminal device, generating, by the cloud server, the registration template, and importing a product serial number of the to-be-connected terminal device into the registration template.

3. The Internet of Things tablet device registration method based on a registration template according to claim 1, wherein the method further comprises the following step: grouping, by the cloud server, the terminal device based on a link grouping configuration of the registration template.

4. The Internet of Things tablet device registration method based on a registration template according to claim 1, wherein the establishing, by the terminal device, a communication connection to the cloud server based on the communication token comprises the following steps:
   placing, by the cloud server, the communication token in a response packet of the registration request as a response parameter, and returning the response packet to the terminal device; and
   after receiving the response packet indicating successful registration, obtaining, by the terminal device, the communication token in the response packet, and establishing a communication connection to the cloud server by using the communication token and an MQTT protocol.

5. The Internet of Things tablet device registration method based on a registration template according to claim 4, wherein content of the initialization setting comprises initial volume and brightness, function permissions, application locking, and initial application of the terminal device.

6. The Internet of Things tablet device registration method based on a registration template according to claim 2, wherein the establishing, by the terminal device, a communication connection to the cloud server based on the communication token comprises the following steps:
   placing, by the cloud server, the communication token in a response packet of the registration request as a response parameter, and returning the response packet to the terminal device; and
   after receiving the response packet indicating successful registration, obtaining, by the terminal device, the communication token in the response packet, and establishing a communication connection to the cloud server by using the communication token and an MQTT protocol.

7. The Internet of Things tablet device registration method based on a registration template according to claim 6, wherein content of the initialization setting comprises initial volume and brightness, function permissions, application locking, and initial application of the terminal device.

8. The Internet of Things tablet device registration method based on a registration template according to claim 3, wherein the establishing, by the terminal device, a communication connection to the cloud server based on the communication token comprises the following steps:

placing, by the cloud server, the communication token in a response packet of the registration request as a response parameter, and returning the response packet to the terminal device; and after receiving the response packet indicating successful registration, obtaining, by the terminal device, the communication token in the response packet, and establishing a communication connection to the cloud server by using the communication token and an MQTT protocol.

9. The Internet of Things tablet device registration method based on a registration template according to claim 8, wherein content of the initialization setting comprises initial volume and brightness, function permissions, application locking, and initial application of the terminal device.

10. An Internet of Things tablet device registration system based on a registration template, comprising a terminal device, a device registration module, and a remote instruction module, wherein the device registration module and the remote instruction module are in a cloud server;

the terminal device automatically invokes an open registration interface of the cloud server and sends a zero-contact registration request to the cloud server; the terminal device is further configured to download an initialization configuration task from the cloud server, and completes initialization setting based on the initialization configuration task, wherein the initialization configuration task is generated by the cloud server based on configuration content of a retrieved registration template;

the device registration module retrieves a corresponding registration template based on a product serial number in the zero-contact registration request, binds the retrieved registration template to the terminal device, and generates a communication token corresponding to the terminal device; and the remote instruction module is configured to establish a communication connection between the terminal device and the cloud server based on the communication token.

11. The Internet of Things tablet device registration system based on a registration template according to claim 10, wherein the cloud server further comprises a registration template module; and the registration template module is configured to generate a registration template, and the registration template has a corresponding identification code.

\* \* \* \* \*